US006408975B1

(12) United States Patent
Bishop et al.

(10) Patent No.: US 6,408,975 B1
(45) Date of Patent: Jun. 25, 2002

(54) VARIABLE DISPLACEMENT PUMP WITH ELECTRONIC CONTROL

(75) Inventors: Leonard F. Bishop, Sterling Hts.; Shawn P. Cap'ser, Monroe; John D. Dalpiaz, New Boston, all of MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/634,975

(22) Filed: Aug. 9, 2000

(51) Int. Cl.[7] .................................................. B62D 5/08

(52) U.S. Cl. ........................ 180/422; 417/283; 180/441

(58) Field of Search ................................ 180/417, 421, 180/422, 423, 441, 283; 417/279, 295, 296

(56) References Cited

U.S. PATENT DOCUMENTS

| | | | |
|---|---|---|---|
| 2,238,061 A | | 4/1941 | Kendrick |
| 3,067,693 A | | 12/1962 | Lambeck |
| 4,067,664 A | | 1/1978 | Robeller |
| 4,325,677 A | | 4/1982 | Nonnenmacher |
| 4,405,288 A | | 9/1983 | Stockton |
| 4,468,173 A | | 8/1984 | Dantlgraber |
| 4,485,883 A | | 12/1984 | Duffy |
| 4,518,893 A | | 5/1985 | Nonnenmacher |
| 4,531,893 A | | 7/1985 | Okoh et al. |
| 4,710,106 A | | 12/1987 | Iwata |
| 5,265,019 A | * | 11/1993 | Harara et al. |
| 5,471,959 A | * | 12/1995 | Sturman |
| 5,518,380 A | | 5/1996 | Fujii et al. |
| 5,538,400 A | | 7/1996 | Konishi et al. |
| 5,562,432 A | | 10/1996 | Semba et al. |

FOREIGN PATENT DOCUMENTS

| | | | |
|---|---|---|---|
| DE | 2363480 | | 6/1975 |
| DE | 2448469 | | 4/1976 |
| JP | 56-146085 | | 11/1981 |
| JP | 57-062986 | | 4/1982 |
| JP | 57-131888 | | 8/1982 |
| JP | 57-131889 | | 8/1982 |
| JP | 59-070891 | | 4/1984 |
| JP | 61-155046 | * | 7/1986 |
| JP | 61-218482 | * | 9/1986 |

* cited by examiner

*Primary Examiner*—Kevin Hurley
(74) *Attorney, Agent, or Firm*—John E. Kajander

(57) ABSTRACT

A variable displacement pump 28 having an electronically modulated solenoid relief valve 100 for controlling fluid flow into the pump 28. An engine control module coupled to the electronic relief valve 100 monitors vehicle speed and steering wheel turning rate change directs the solenoid relief valve 100 to adjust the pressure of fluid displacing a movable cam ring 44 within the pump 28 to provide for greater fluid flow when evasive maneuvers may be required and lesser fluid flow when low steering efforts are needed, thus resulting in energy and fuel savings.

7 Claims, 4 Drawing Sheets

114
112
124
120
128
126
108
150
144
131
116
110
104
152
102
88
70
86
56
52
50
34
71
58
78
82
32
72
28
76

VARIABLE DISPLACEMENT PUMP WITH ELECTRONIC CONTROL

TECHNICAL FIELD

The present invention relates to fluid pumps and more particularly a variable displacement pump with electronic control for use in automobiles.

BACKGROUND

Power-assisted steering systems are systems used to aid drivers in controlling vehicles on the roads at low and high speeds by providing assistance to drivers in turning the steering wheel under various conditions. Power steering systems typically comprise a rack-and-pinion steering gear mechanism in which the gear rack is connected to a steering gear linkage. The rack engages a pinion gear that is connected to a driver operated steering shaft. A power steering pump is typically coupled to the rack-and-pinion gear mechanism to provide steering assistance to the rank-and-pinion gear as necessary. The power steering pump uses a rotary vane mechanism to control distribution of pressure from a power steering pump to the fluid motor portions of the rack-and-pinion steering gear mechanism. One type of power steering pump commonly used in automotive systems is the constant displacement rotary vane pump.

Constant displacement rotary vane pumps of the type used in power steering devices have a flow rate proportional to rotor speed. The steering gear supplied with pressurized hydraulic fluid from the pump requires high flow rates when vehicle speed is low and low flow rates when vehicle speed is high. With a constant displacement pump, however, the flow of hydraulic fluid from the pump is controlled by the rotor speed, and not by the amount of steering assistance needed. Excess hydraulic fluid is bypassed internally within the pump, creating heat and excess torque, which adversely affects fuel economy.

To improve the feel of a power steering system at all speeds and to make the system more fuel economical, conventional power steering systems may use electronic variable orifice (EVO) power steering systems. In an EVO power steering system, the fixed orifice of a power steering system is removed in the pump assembly and replaced with an EVO actuator. The EVO actuator is a flow control valve that is threaded onto the outlet of the pump which regulates flow rate as a function of vehicle speed as determined by an algorithm control. The EVO system works by providing high flow rates to the steering gear at low vehicle speeds (EVO actuator fully open) and lower flow rates as vehicle speeds increase (EVO actuator begins to close). A Hand Wheel Speed Sensor is typically used to in conjunction with the EVO system to increase steering assistance when it senses that the vehicle operator is making an evasive maneuver. The excess flow, which the pump produces in high or low speed situations, is normally bypassed internally within the pump.

Recently, improvements have focused on alleviating the excess flow that must be bypassed internally within the pump. To accomplish this, a variable displacement pump replaces the constant displacement pump. In conventional variable displacement pumps, a cam ring is provided movably in a pump casing. A pair of fluid pressure chambers serving as control chambers are formed in a gap between the cam ring and the pump casing, and the pressure on the upstream and downstream sides of an orifice provided midway in a discharge passage is made to act directly on the cam ring so as to move the cam ring against the urging force of a spring to change the volume of the pump chamber. Thus, in typical variable displacement pumps, output flow from the pump may be maintained at or near a constant rate regardless of engine speed.

Under ideal circumstances, the amount of pump flow needed varies with the amount of power assistance needed. For example, in situations where no power assistance is necessary, the pump flow through the pump would approach zero flow. When more assistance is necessary, the amount of pump flow correspondingly increases. Unfortunately, currently available variable displacement pumps do not approach zero flow when no power steering assistance is needed. The excess flow produced by the pump flows through the steering system and creates heat and excess torque, which adversely affect fuel economy.

SUMMARY OF THE INVENTION

It is thus an object of the present invention to provide a variable displacement pump having an electronically controlled variable relief valve that virtually eliminates excess flow by supplying only the amount of fluid required for steering assist at any speed and driving condition.

The above object is accomplished by providing a variable displacement pump having an electronically modulated solenoid relief valve for controlling fluid flow into the pump. An engine control module coupled to the electronic relief valve monitors vehicle speed and steering wheel turning rate change to adjust the pressure of fluid displacing the movable cam ring to provide for greater fluid flow when evasive maneuvers may be required and lesser fluid flow when low steering efforts are needed, thus resulting in energy and fuel savings.

The present invention has the added benefit that it adds little complexity to currently available pump housings.

Other objects and advantages of the present invention will become apparent upon considering the following detailed description and appended claims, and upon reference to the accompanying drawings.

DESCRIPTION OF THE PREFERRED EMBODIMENT(S)

Figure 1:
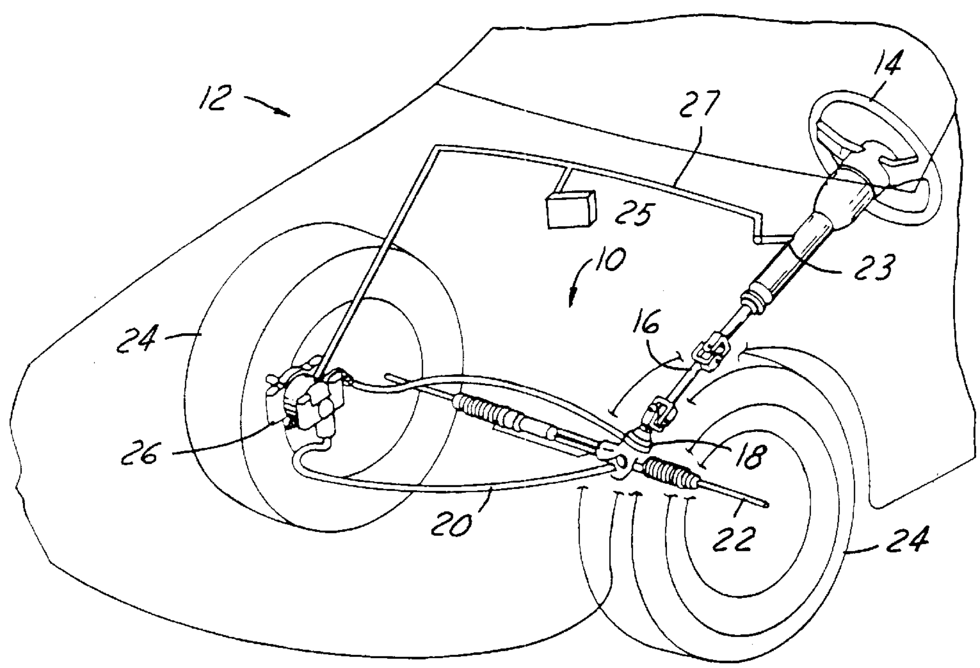
FIG. 1 is a high level perspective view of a vehicle having a hydraulic power rack and pinion steering system according to a preferred embodiment of the present invention.

Referring to FIG. 1, Referring to FIG. 1, a hydraulic power rack and pinion steering assembly 10 of a vehicle 12 according to a preferred embodiment is shown. The assembly 10 also has as its major components a steering wheel 14, a steering shaft 16, a gear housing 18, a power cylinder (not shown), hydraulic lines 20, a pair of tie rods 22, tires 24, and a power steering pump 26. The power steering pump 26 is typically a rotary vane mechanism.

In operation, when the steering wheel 14 is turned, the weight of the vehicle 12 causes the front tires 24 to resist turning. This twists a torsion bar (not shown) or thrusts a pinion shaft within the gear housing 18, making the control valve (not shown) on the gear housing 18 to move and align specific fluid passages. Fluid flows through the rotary vane mechanism in the pump 26, out the hydraulic lines 20, and into the power cylinder. Pressure then acts on the power piston (not shown) contained within the gear housing 18 to help push the rack and front wheels 24 for turning. In addition, a hand wheel sensor 23 and a vehicle speed sensor 25 are electrically coupled through an electrical harness 27 with a electronic control module (not shown) that is coupled to an electronic relief valve (shown as 100 in FIGS. 2–6 below). The electronic relief valve 100 receives signals from the electronic control module corresponding to vehicle speed and steering wheel turning rate to control the flow rate of hydraulic fluid out of the pump 26 to aid the vehicle 12 to turn in various circumstances. The mechanism for controlling the flow rate using the electronic relief valve 100 is described below.

FIGS. 2–6 show various perspective and cross-sectional views of a vane-type variable displacement pump 28 according to a preferred embodiment of the present invention.

Figure 2:
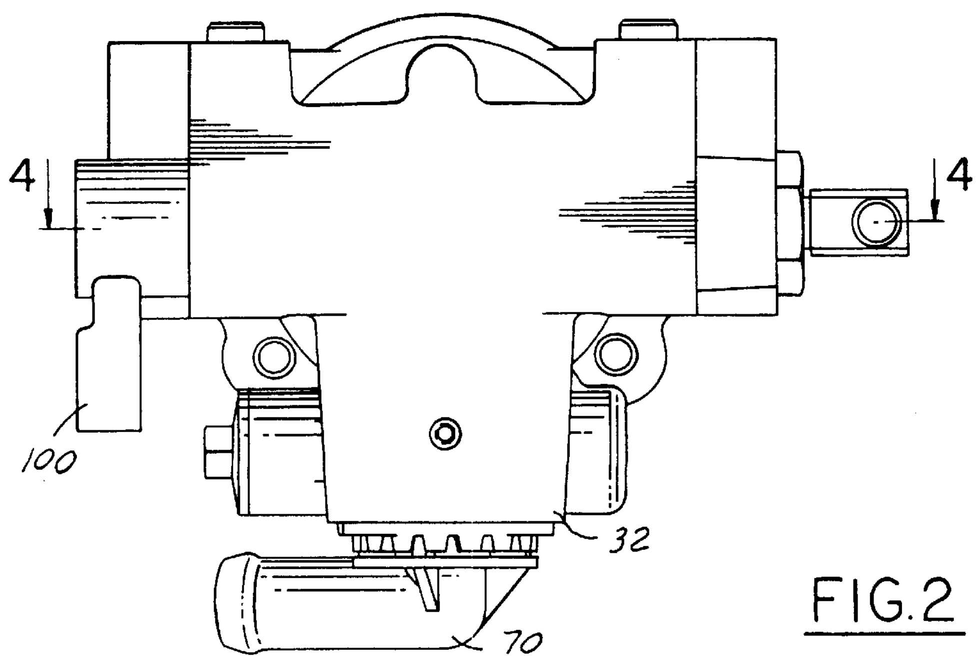
FIG. 2 is a perspective view of the outer housing of a power steering pump according to a preferred embodiment of the present invention.
Figure 3:
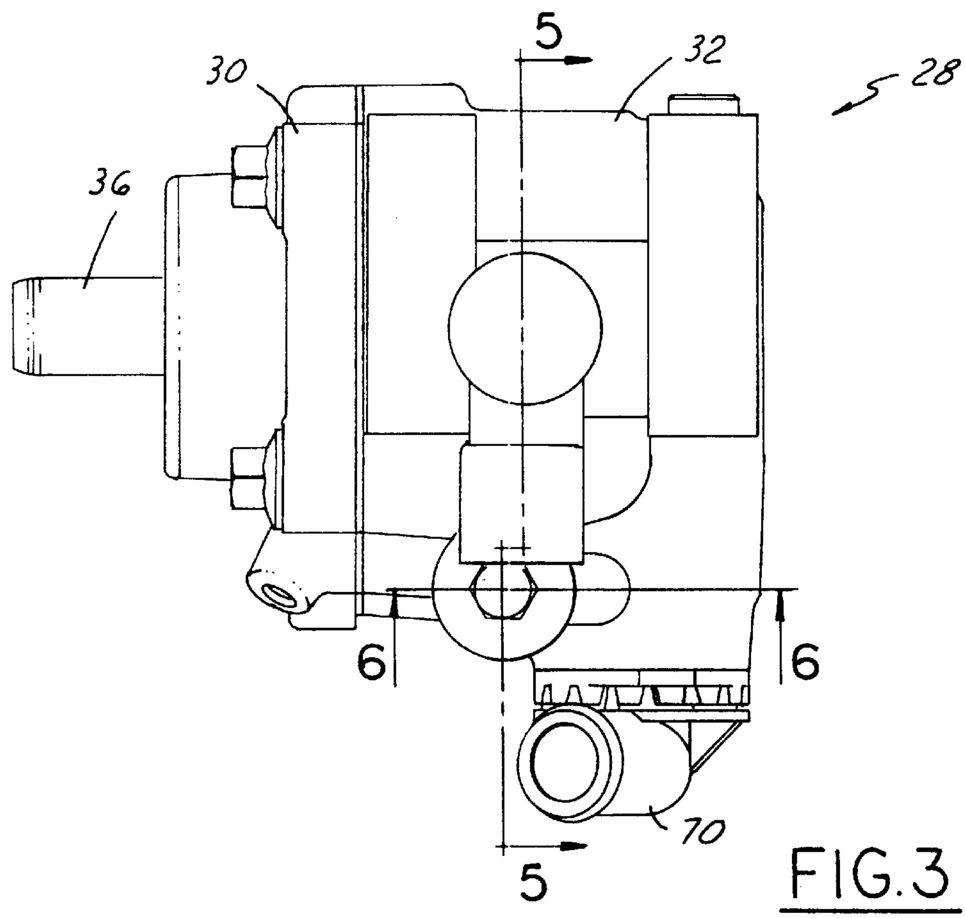
FIG. 3 is another perspective view of FIG. 2 rotated 90 degrees.

In FIGS. 2 and 3, a high-level perspective view of a preferred embodiment of the pump 28 according to the present invention is illustrated in two views rotated 90 degrees relative to each other. The pump 28 has as its major components a front body 30 and a rear body 32. A fluid inlet 70 is integrally formed on the rear body.

Figure 4:
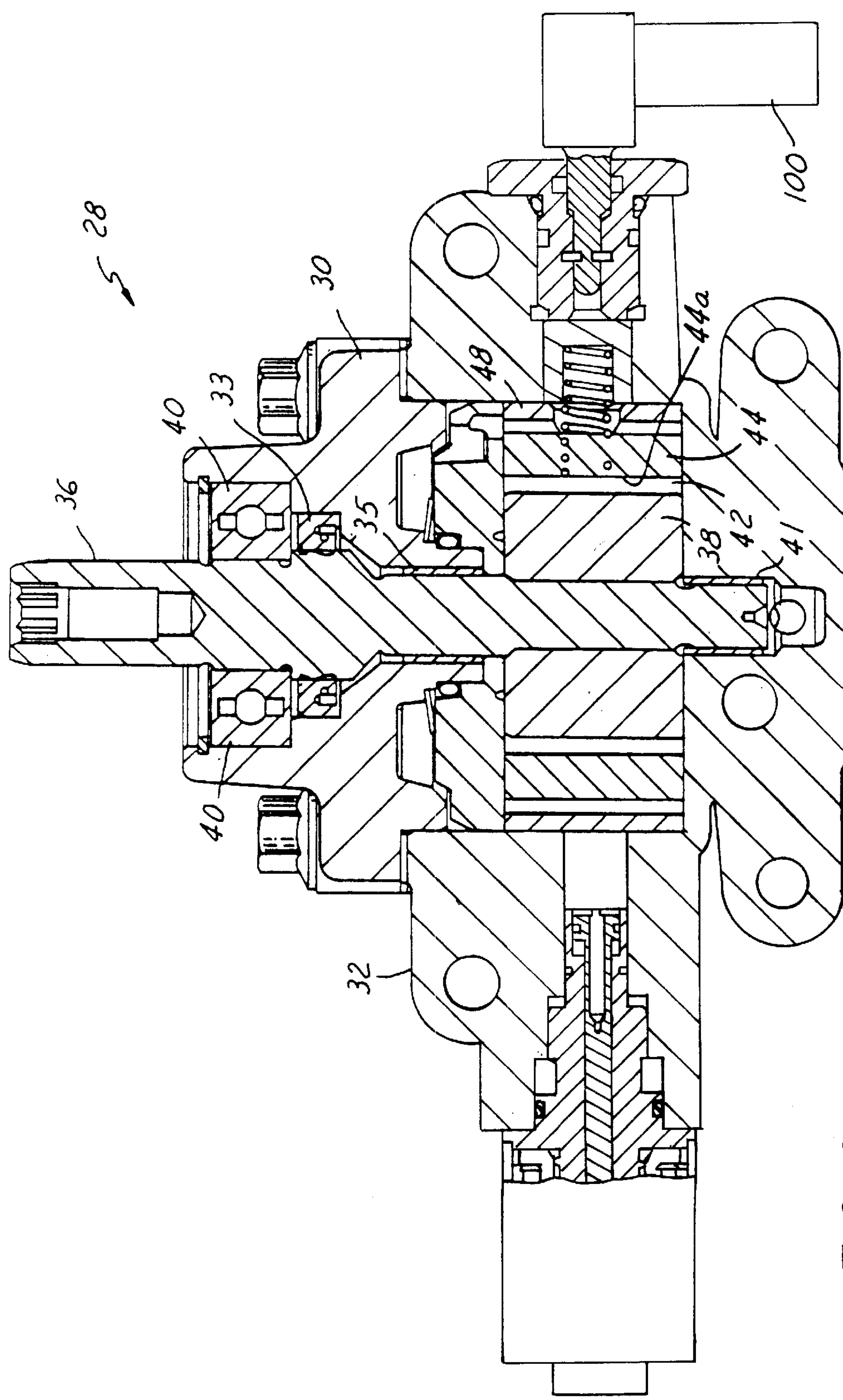
FIG. 4 is a cross-sectional view of FIG. 2 taken along line 4—4.

As best shown in FIG. 4, a drive shaft 36 for driving a rotor 38 is fitted into the front body 30 and is rotatably supported by bearings 40 on the side of the rear body 32. A shaft seal 33 and a bushing 35 are also pressed between the front body 30 and the rotor 36. A cam ring 44 having an inner cam surface **44*a* is fitted around the outer periphery of the rotor 38 and within an outer ring 48. The rotor 38 has vanes 42 laced within the rotor slots (shown as 38*a* on FIG. 5). A cam spring 58 is secured within the discharge chamber 72 and urges the cam 44 away from the discharge chamber 72. The discharge chamber 72 is fluidically coupled to the fluid outlet 74, which is integral with the rear body 32. Collectively, the discharge chamber 72 and the fluid outlet 74 are referred to as the fluid outlet port 76**.

Figure 5:
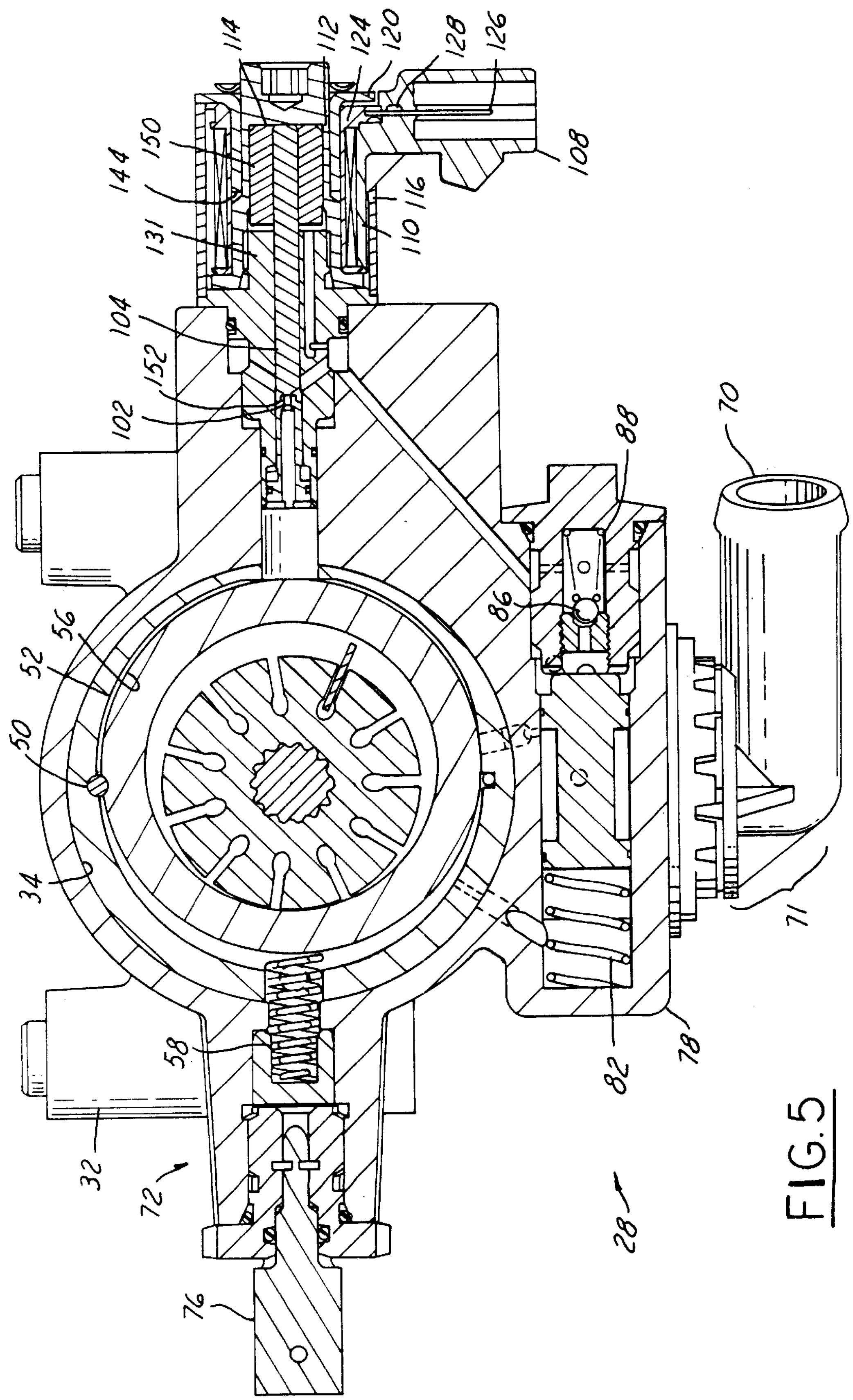
FIG. 5 is a cross-sectional view of FIG. 3 taken along line 5—5.

FIG. 5 is a cross-sectional view of FIG. 3 taken along line 5—5. The cam ring 44 forms a pumping chamber 46 between the inner cam surface **44*a* and the rotor 29. An outer ring 48 is used for holding the cam ring 44 movably and displaceably within the accommodating space 34 in the rear body 32. In this arrangement, the volume of fluid in the pump chamber 46 varies as a function of the position of the cam ring 44 disposed within the outer ring 48. An alignment pin 50 secures the outer ring 48 to the rear body 32 and functions as a pivotally supporting portion for the swinging displacement of the cam ring 44**.

Further, reference numerals 52, 54 designate a pair of fluid-pressure chambers which become high- and low-pressure sides each formed on the outer periphery of the cam ring 44 in the elliptical space 56 of the outer ring 48. Passages 53 and 55 are fluidically coupled to the chambers 52, 54 and used for introducing fluid pressure for swinging and displacing the cam ring 44. When fluid pressure is introduced to the low-pressure chamber 54 through passage 55 or when fluid pressure is introduced to the high-pressure chamber 52 through passages 53, the cam ring 44 is swung and displaced in a desired direction to render variable the volume in the pumping chamber 46. A cam spring 58 is positioned near the low-pressure chamber 54 so that the pumping chamber 46 volume is normally maintained at a maximum level. In addition, a wiper seal 60 is positioned on the outer periphery of the cam ring 44 so as to define high-pressure chamber 52 and low-pressure chamber 54 with the pivotably supporting alignment pin 50 provided on the outer periphery thereof.

Also formed integrally on the rear body 32 is a spool valve chamber 78. The spool valve chamber 78 and the fluid inlet 70 comprise the combination inlet port 71.

Reference number 62 designates a pump-suction side opening which is open in face-to-face relation to a pump-suction region 64 in the pump chamber 46. Reference number 66 designates a pump-discharge opening which is open in face-to-face relation to a pump-discharge region 68. Fluid is received into the pump-suction side chamber 62 through a fluid inlet 70 of a combination inlet port 71. Fluid is then discharged through a discharge chamber 72 contained within the cam spring 58 to an outlet chamber 74 of the fluid outlet port 76. The fluid outlet port 76 then provides hydraulic fluid to various equipment such as a power steering apparatus. The fluid outlet port 76 is integrally formed on the rear body 32 of the power steering pump 28.

The fluid inlet 70 receives fluid from the reservoir (not shown) that the pump 28 will provide to various steering components. The fluid inlet 70 has three passages through which fluid may flow. First, fluid may flow through the pumping chamber passage 73 to the pump-suction side chamber 62. Second, fluid may flow through the rotor inlet passage 75 and behind the shaft seal 33. Third, fluid may flow through the inlet passage 84 and into the spool valve chamber 78.

Figure 6:
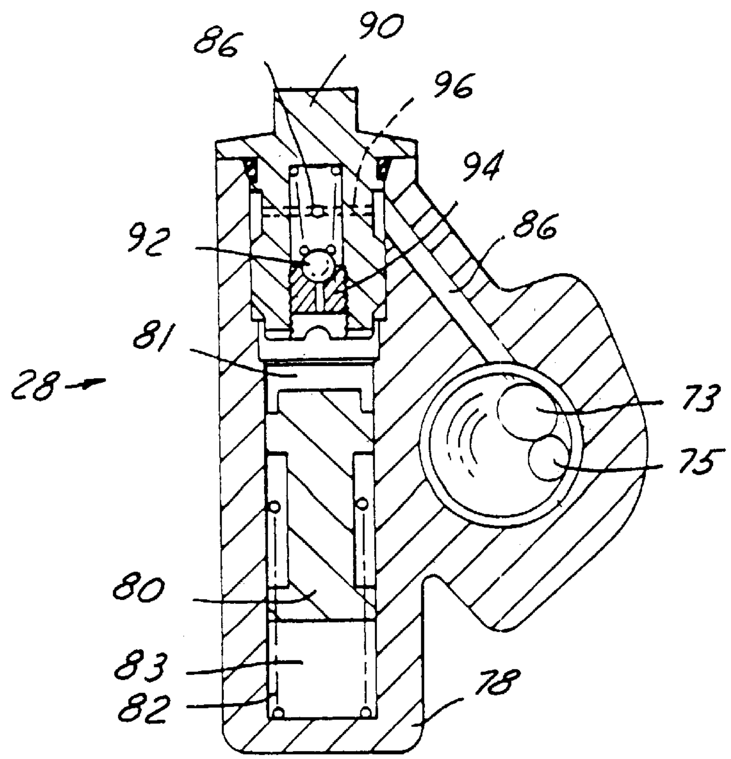
FIG. 6 is a cross-sectional view of FIG. 2 taken along line 6—6.

As best seen in FIGS. 5 and 6, the spool valve chamber 78 has a spool valve 80, a valve spring 82, an inlet passage 84, a pressure release valve 90, a pressure relief spring 88 and the previously mentioned pump-suction opening 62 and pump-discharge opening 66. The pressure relief valve 90 has a relief valve inlet 94, a ball 92, and a relief valve outlet 96. The relief valve outlet 96 is fluidically coupled to the pressure relief passage 86.

The spool valve chamber 78 contains a spool 80 biased against a spool valve spring 82. This forms two chambers in the spool valve chamber 78, a first chamber 81 on the upstream side and a second chamber 83 on the downstream side that contains the spool valve spring 82.

The spool valve chamber 78, in operation, has two functions. First, at higher vehicle speeds, fluid pressure builds up across the outlet orifice 98, and correspondingly in the first chamber 81, pushing the spool valve 80 in a translational direction towards the valve spring 82 and exposing passage 53 in the first chamber 81. This fluid pressure travels through the passage 53 into the high-pressure chamber 52, causing the cam ring 44 to urge against the cam spring 58. The excess volume of fluid pressure in the low-pressure chamber 54 is then pushed through passage 55 and into the second chamber 83. As explained above, this action decreases the pumping chamber 46 volume. Excess pressure in the first chamber 81 causes the ball 92 to move in a translational direction towards the pressure relief spring 88, thereby exposing a relief valve outlet 96. Excess fluid pressure may then exit the first chamber 81 through the relief valve outlet 96, through the passage 86, and return to a reservoir (not shown).

At lower pressures, the spool valve 80 is normally biased to cover the passage 53. In this position, the cam ring 44 is urged away from the cam spring 58, and the pumping chamber 46 volume is increased. Also, fluid pressure escapes from the second chamber 83 through the passage 55 and into the low-pressure chamber 54.

Also attached to the rear body 32 is an electronic relief valve 100. The electronic relief valve 100 is electronically and fluidically coupled to the high-pressure chamber 52 through a flow orifice 102. The electronic relief valve 100 includes a non-magnetic protective housing 108, a non-magnetic cylindrical core tube 112 having an interior chamber 114, a solenoid coil 110 encircling the core tube 112, a magnetizable outer sleeve 116 encircling the solenoid coil 110, a magnetizable fluid fitting 118 affixed to the core tube 112, a magnetizable inner sleeve 120 interposed between the solenoid coil 110 and the core tube 112, and an armature assembly 106 movably mounted within the core tube 112. A magnetic circuit is formed by the inner sleeve 120, the outer sleeve 116, the fluid fitting 118 and the armature assembly 106. Generally, the sleeves 116 and 120, core tube 112, fluid fitting 118, and armature assembly 106 are concentrically arranged relative to the housing 108 and the armature axis.

The solenoid coil 110 comprises a bobbin (not shown), a central bore (not shown) extending through the spool, and an outer surface (not shown) about which an electrical wire (not shown) is wrapped whereby to form a cylindrical coil (not shown). A terminal block portion 124 is integrally formed on one end of the spool portion to receive and position a pair of electrical terminals 126, one terminal being terminated to each respective wire end 128.

The fluid fitting 118 is typically formed of a magnetizable metal, such as a ferromagnetic material, and comprises the pole piece of the magnetic circuit. The fluid fitting 118 includes generally a cylindrical body 130 having opposite axial portions 132 and 134, a medial flange 136 having a mating face 138, and an end 140 defining a fluid inlet into the fitting 118.

The outer sleeve 116 is generally cylindrical, comprised of a ferromagnetic material, and adapted to slidably fit about the housing member 108. The outer sleeve 116 has an end face 142 that is adapted to abut the mating face 138. The inner sleeve 120 is comprised of a ferromagnetic metal that is not subject to hysteresis or tends to remain magnetized. The inner sleeve 120 is in the form of a cylindrical tube which is open at one end 144 and a radially directed flange 146 at the other, abutting the outer sleeve 116 at its inner end face 148. The purpose of the inner sleeve 120 is to form a flux collector with the flange 146 concentrating and radially directing magnetic flux between the sleeves 116 and 120 during operation of the valve 100, without effecting the pulling force on the armature assembly 106.

The armature assembly 106 includes a magnetizable armature 150 encircled by the solenoid coil 110 and a nonmagnetic pintle spool 104 for movement therewith and towards the flow orifice 102 whereby to adjust the volume of fluid passed through the valve 100. The pintle spool 104 is axially elongated and has a distal end 152 of generally conical shape adapted to be brought in close registry with the flow orifice 102 whereby to restrict fluid flow through the inlet. Alternatively, the distal end 152 may be square shaped or flat whereby to restrict the flow through the flow orifice 102. Further, a cylindrical bearing support (now shown) is fixedly disposed within the fluid fitting 118 to support the pintle spool 104 for reciprocating movement and to assure that the distal end 152 is concentrically positioned relative to the orifice 102. Further, a drain passage 154 fluidically couples the relief valve 100 with the passage 86 which leads to a reservoir (not shown). The drain passage 154 is positioned such that as the pintle spool 104 moves towards the flow orifice 102, the body of the pintle spool 104 covers the drain passage 154. As the pintle spool 104 moves away from the flow orifice 102, the drain passage 154 is exposed.

The electronic relief valve 100, in operation, has three functions. First, it can increase the pressure in the high-pressure chamber 52, thereby minimizing the pumping chamber 46 volume and fluid flow through the pump 28. This position is desirable when little or no steering assistance is required by the steering system, such as in parking or low speed maneuvering. Second, the electronic relief valve can maintain the pressure in the high-pressure chamber. Third, the electronic relief valve can decrease the pressure in the high-pressure chamber 52, thereby increasing the pumping chamber 46 volume and fluid flow through the pump 28. This position is desired where high amounts of power assistance are required, such as in high speed maneuvering. Each function is described below.

First, the electronic relief valve 100 may increase the pressure within the high-pressure chamber 52, thereby ensuring that the pumping chamber 46 volume approaches a predetermined minimum flow level as defined by the operating environment. This is done by moving the pintle spool 104 towards the flow orifice, thereby covering the drain passage 106. In this way, little or no fluid is pumped through the variable displacement pump 28 that will need to be bypassed internally within the pump 28.

The action to move the pintle spool 104 towards the flow orifice 102 is controlled by an electronic control module (not shown). The electronic control module interprets signals regarding speed of the vehicle from a vehicle speed sensor 25 and the steering wheel turning rate from a hand wheel sensor 23 to determine a proper amount of steering assist to provide a driver. The electronic control module then increases the current provided to the electronic relief valve 100 through the electronic terminals 126. The electrical current travels through the solenoid coil 110, thereby creating a magnetic field. The magnetic field causes the armature assembly 106 and pintle spool 104 to be directed towards the flow orifice 102, thereby increasing the pressure within the high-pressure chamber 52. This increased pressure further biases the movable cam 44 towards the cam spring 58, thereby further decreasing the pumping chamber 46 volume, and hence decreasing the flow rate through the fluid outlet port 76 of the pump 28. This will correspondingly decrease the amount of steering assist available for the operator.

Second, to increase the steering assist for the operator, the electronic control module signals a decrease in the amount of current provided to the electrical terminals 126. The magnetic field is lessened, causing the armature assembly 106 and pintle spool 104 to be directed away from the flow orifice 102, thereby decreasing the pressure within the high-pressure chamber 52. This decreased pressure further biases the movable cam 44 away the cam spring 58, thereby further increasing the pumping chamber 46 volume, and hence increasing the flow rate through the fluid outlet port 76 of the pump 28. This will correspondingly increase the amount of steering assist available for the operator. Further, as the pintle spool moves 104 from the flow orifice 102, a drain passage 154 is exposed. This drain passage 154 provides an escape for pressurized hydraulic fluid back to the pressure relief orifice 86 and back to the reservoir. This further biases the movable cam 44 away from the cam spring 58, further increasing the pumping chamber 46 volume and fluid flow available for steering assist.

Third, to maintain the pressure in the high-pressure chamber 52, simply maintain the current supplied to the electrical terminals 126. The pintle spool 104 and armature assembly 106 remain stationary, thus the pumping chamber 46 volume remains constant.

The variable displacement pump 28 with electronic control offers improvements over conventional displacement pumps. First, a bypass mechanism for excess fluid flow being pumped through the pump is unnecessary, as the electronic relief valve 100 regulates the pressure in the high-pressure chamber 52 to effectively reduce the fluid flow through the pump 28 to zero. As such, heat loss and excess torque is eliminated, which in turn increases fuel economy. Second, the electronic control of the electronic relief valve 100 provides variable response that provides the proper amount of power assist as required for a particular maneuver. Third, the system is capable of low steering assist for parking and low speed maneuvers. Fourth, the electronic relief valve 100 can be provided without adding undue complexity to the variable displacement pump 28.

While the invention has been described in terms of preferred embodiments, it will be understood, of course, that the invention is not limited thereto since modifications may be made by those skilled in the art, particularly in light of the foregoing teachings.

What is claimed is:

1. An electronically controlled variable displacement pump system comprising:

a variable displacement pump having a pump body;

a high-pressure fluid chamber disposed within said pump body; and an electronic relief valve fluidically coupled to said high-pressure fluid chamber that regulates pressure within said high-pressure fluid chamber.

2. The electronically controlled variable displacement pump system according to claim 1 further comprising an electronic control module electronically coupled to said electronic relief valve, wherein said electronic control module receives a first signal from a first sensor corresponding to vehicle speed and a second signal from a second sensor corresponding to steeling wheel turning rate, wherein said electronic control module sends a third signal to said electronic relief valve as a function of said first signal and said second signal to selectively increase, decrease or hold constant the pressure in said high-pressure chamber.

3. The electronically controlled variable displacement pump system according to claim 2, wherein said third signal is a current signal.

4. The electronically controlled variable displacement pump system according to claim 3, wherein said current signal is decreased to said electronic relief valve to decrease the pressure in said high-pressure chamber.

5. The electronically controlled variable pump system according to claim 4, wherein said decreased current signal moves a pintle spool in said electronic relief valve to expose a drain passage, said drain passage capable of removing fluid and decreasing pressure in said high-pressure chamber.

6. The electronically controlled variable displacement pump system according to claim 3, wherein said current signal is increased to said electronic relief valve to increase the pressure in said high-pressure chamber.

7. The electronically controlled variable displacement pump system according to claim 6, wherein said increased current signal induces an increased magnetic field to move a pintle spool in said electronic relief valve towards said high-pressure chamber, thereby increasing pressure in said high-pressure chamber.

* * * * *